United States Patent [19]

Puranik et al.

[11] 3,894,193

[45] July 8, 1975

[54] TELEPHONE INTERCEPT APPARATUS

[75] Inventors: Hari Keshav Puranik, Milan; James Lawrence Stepan, Humboldt, both of Tenn.

[73] Assignee: International Telephone & Telegraph Corporation, New York, N.Y.

[22] Filed: May 15, 1974

[21] Appl. No.: 470,054

[52] U.S. Cl. .......... 179/27 FG

[51] Int. Cl. .......... H04m 3/52

[58] Field of Search..... 179/27 FG, 98, 18 B, 18 BE

[56] References Cited

UNITED STATES PATENTS 3,426,156 2/1969 McCaffrey et al.......... 179/27 FG X

*Primary Examiner*—William C. Cooper

*Attorney, Agent, or Firm*—James B. Raden; Marvin M. Chaban

[57] ABSTRACT

Disclosed is an improved apparatus for providing an intercept function for a step-by-step telephone system. To provide this intercept function, an intercept strap or clip member is used on the main distributing frame. This member provides direct wire connections for the T and R leads and provides a determined resistance in the sleeve lead. This resistance allows the guard relay in the final switch (connector) of the step-by-step switch train to operate while preventing a switch-through relay in the connector from operating. This combination of one relay operative and the other inoperative prevents the called line from being provided with ring current and permits the call connection to be forwarded to an intercept signalling apparatus. This condition can also be sensed by a number identifier to identify the called line.

5 Claims, 3 Drawing Figures

TELEPHONE INTERCEPT APPARATUS

DESCRIPTION OF THE PRIOR ART

Intercepting of calls directed to inoperative lines is a function well-known in the telephone art. In some systems, the three leads from a called line on intercept are channelled to an intercept operator by way of a wire to wire clip arrangement at the distributing frame. In such systems, the final switch in the switching network is switched through as if a normal call were in process. The wire connection arrangement forwards a signal to an operator or other means to provide an indication to the calling line that the called line is inoperative for some defined reason.

Many patents as issued have employed forms of terminal clips for joining inoperative lines to an intercept trunk or the like. These have included U.S. Pat. Nos. 2,849,700; 3,138,417; 3,312,927; and 3,235,829, all of which show a bridge or printed circuit between terminals to provide the direct connection for tip, ring and sleeve from a line to divert the intercept signalling or intercept operator. These patents were directed to a system in which the intercept facility was designed to serve a single exchange, there being one operator or signalling facility per exchange.

In more complex multi-exchange networks, an intercept bureau commonly used by a plurality of exchanges has come into use. For example, the January, 1974 issue of the Bell System Technical Journal is devoted to Automatic Intercept Systems. In such systems, the intercept bureau provides the intercept message to all calls routed to it over a trunking arrangement. Where the network has access to automatic intercept system (AIS), the intercept signal must be forwarded to AIS bureau along with an indication of the called number.

The present invention is designed for use in step-by-step systems in which the path of a call passes serially through various ranks of switches such as line finders, selectors (first, second, etc.) and connectors. The contacts in the connector bank are connected directly to subscriber lines so that when a connector is seized, the final two digits of the called number bring a set of spaced contactors into contact with stationary contacts of the bank, the contacts representing the called line. The S or sleeve lead is used to provide a busy indication by its test of the K relay of the connector. The K relay switches through on the line being found to be idle by the test over the sleeve lead. Such systems are extremely well-known in the art having been produced for thirty or more years in the same basic form.

SUMMARY OF THE INVENTION

The present invention comprises an apparatus for providing a signal for activating an intercept train to an intercept bureau serving a plurality of exchanges. The intercept signal is maintained in a form suitable for accessing an automatic message accounting apparatus and notifying that apparatus of the called number. In this manner, the calling party will not be charged for the intercepted call and the called number will be identified.

To effect this function, the present apparatus provides a strapping bridge which provides direct wired connection from tip and ring bank contacts of the connector or final switch in the switch train to the intercept train. This connection may be made using a single clip at the main distributing frame in place of the jumpering. The sleeve lead has a resistance of predetermined amount interposed between the connector bank S contact and the path to the intercept train. A parallel path from the sleeve contact passes to the AMA identifier via the automatic number identifier matrix of the AMA identifier.

The resistance in the sleeve or S lead is chosen to prevent the K or switching through relay of the connector from fully switching through. The G relay in parallel with the K relay is operated with the resistance in the circuit. The G relay guards against other connectors in the common connector group from gaining access to the intercept train or buss. This condition, G relay operated, K relay unoperated is sensed as the signal for sensing intercept demand.

It is therefore an object of the invention to provide in a telephone system, an improved intercept sensing apparatus for interfacing between a step-by-step system and an intercept train common to a plurality of exchanges.

It is a further object of the invention to provide an intercept bridging apparatus which produces a condition in the final switch of the exchange switch train signifying an intercept condition on the called line.

It is a still further object of the invention to provide an automatic intercept apparatus for interfacing between a switching exchange, an intercept train and an automatic message accounting apparatus.

Other features, objects and advantages of the invention will become apparent from the following detailed specification viewed in conjunction with the drawings of which the following is a brief description.

DETAILED DESCRIPTION OF THE DRAWINGS

Figure 1:
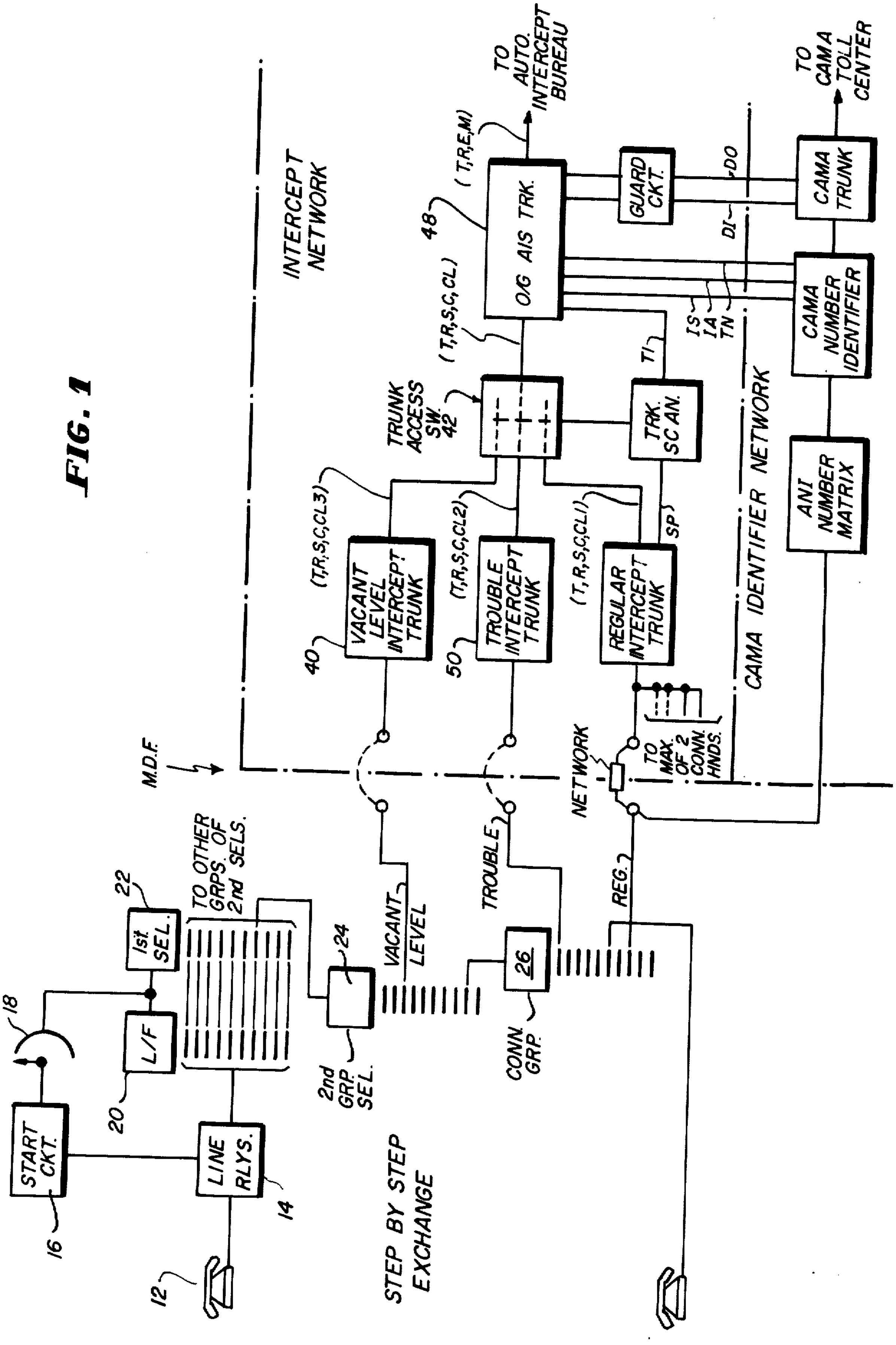
FIG. 1 is a schematic circuit diagram in block form of a system using our invention.

FIG. 1 shows an intercept network using our invention as applied to a step-by-step telephone system of the type well-known in the art for many years.

The step-by-step telephone system shown only symbolically shows a telephone instrument 12 with connection to a block of line relays 14. These relays sense an off-hook condition at the station instrument 12 to activate a start circuit 16. The start circuit 16 causes a rotary switch 18 to find an available line finder 20 and first selector 22. The line finder operates to find the calling station 12 and return dial tone to the calling station. The first selectors have access to groups of intermediate stage selector 24 and groups of final stage switches such as connectors 26 to respond to dialed digits. As is known, the final stage switches or connectors step up and around responsive to dialed impulses to reach a terminal representing and connected to the called line. In the normal course of the call, a through path from an idle called station to the connector being used to further the call provides a low resistance path to the K relay or switch-through relay of the connector (See FIG. 3) via the sleeve lead to cause the K relay to switch through. Switching through of the K relay allows ring current to be fed to called station for completion of the call in the known manner. The operation of these connectors and their K relay is well-known in the art.

When the called station has been disconnected or the number transferred, the call must be intercepted. In earlier times, the tip, ring and sleeve leads from the station whose calls were to be intercepted were connected to an operator's input for manual intercept and reply.

In addition, when a vacant selector level has been dialed, the call should be intercepted to notify the caller of the incorrect digit dialed. In addition, stations or connector terminals exhibiting a trouble condition should also be intercepted.

In the event of a vacant level on an intermediate selector level, a vacant level intercept trunk 40 is connected to the level. This trunk has access to a trunk access switch 42 to find with the aid of a trunk scanner 44 an available outgoing trunk 48 to the intercept office and intercept bureau. Such intercept networks are shown in the January, 1974 issue of the B.S.T.J. as noted previously.

In larger modern systems, an intercept bureau common to a plurality of offices are provided. These intercept bureaus perform the intercept function for a number of offices over trunk lines from the respective offices. However, where a plurality of offices feed the intercept bureau, considerable number identification must be provided.

In a like manner, connector terminals on which there is a trouble condition are also connected directly through to a trouble intercept trunk 50 with access to the trunk access switch 42 and the outgoing trunk 48. Due to the trouble condition, no means must be provided for preventing switch-through of the connector. Both of these functions and the circuits for completing these intercept calls are well-known in the art and any suitable method may be used to implement these functions.

Figure 2:
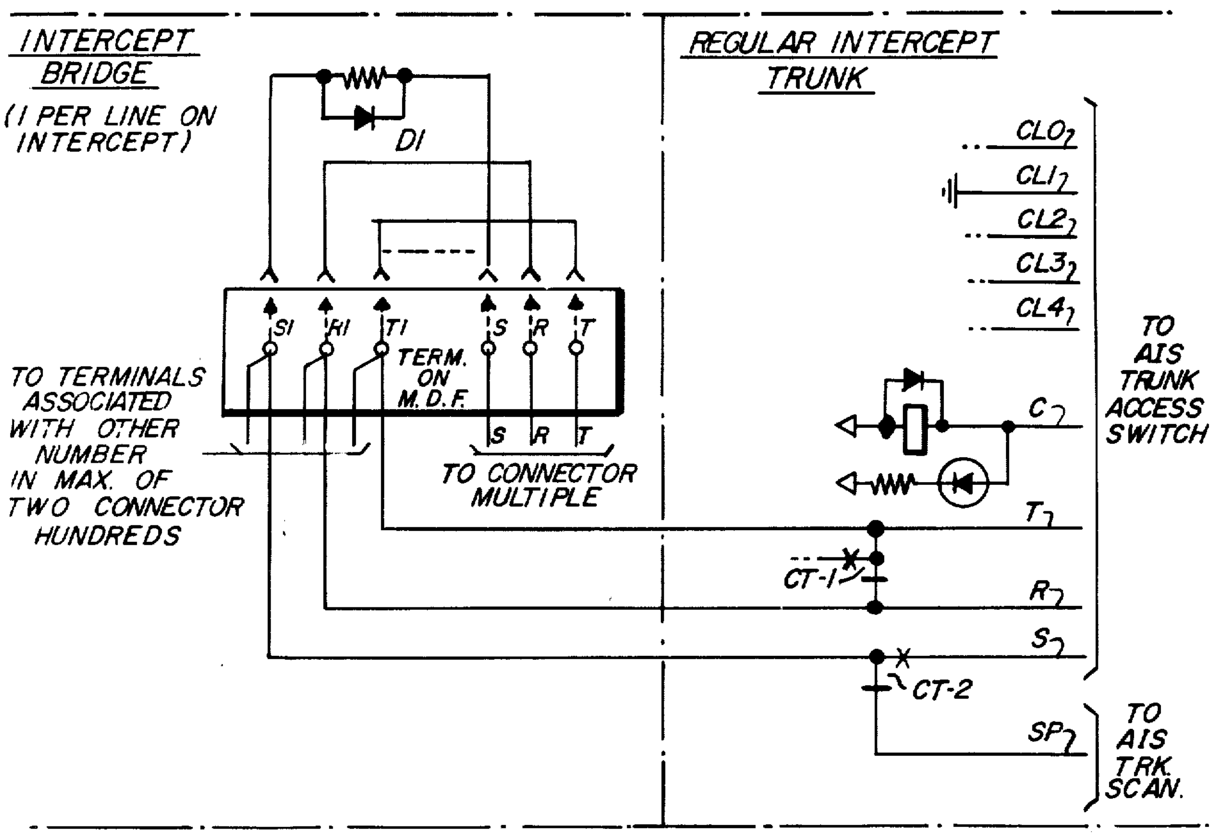
FIG. 2 is a schematic circuit diagram of the bridge and intercept circuits of our invention.
Figure 3:
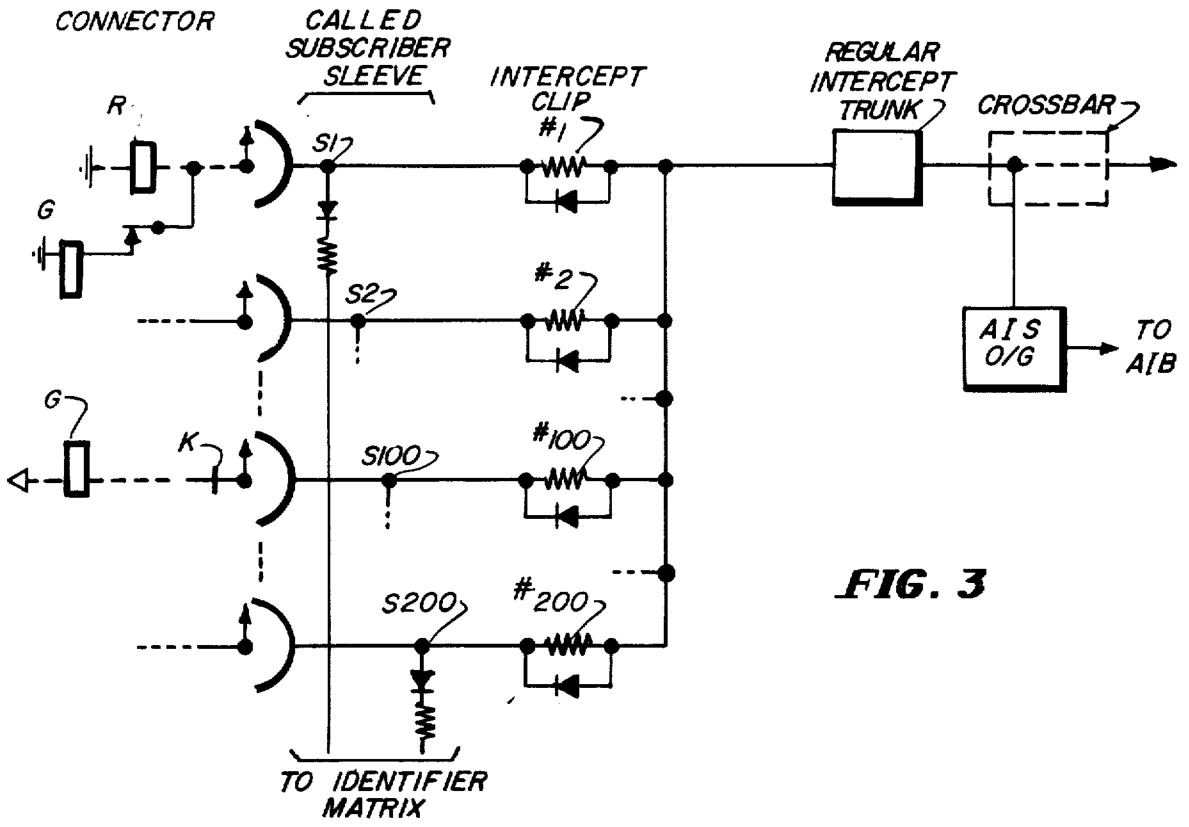
FIG. 3 is a simplified schematic drawing showing the principle of our invention.

The regular intercept condition, however, requires different treatment. The connector 26 must be prevented from switching through and the calling line must be held through the connector. To provide a device for holding the connector seized but preventing the connector from switching through, we provide an intercept terminal clip to be connected to the tip, ring and sleeve leads. The tip and ring leads from the connector terminal are directly wired to like leads to the regular intercept trunk through the clip. Within the clip, the sleeve lead has a parallel combination of a resistor and diode as can be seen in FIGS. 2 and 3. This ground may be 1.3 K ohms. We have found that while a resistance of up to 2,000 ohms will prevent the K relay from operating, the resistance may cause malfunction of other parts of the circuit. Thus, the upper limit of resistance of the bridge resistor may be considered as 2,000 ohms. The lower limit of the resistance would be approximately 1,000 ohms to prevent the operation of the K relay of the connector.

The resistance-diode combination is applied in the location indicated by the numeral 70 in FIG. 1, the diode being biased to prevent false operation of the K relay. As can be seen in FIG. 1, the sleeve lead from the connector terminal to the clip are also multipled to the CAMA identifier of the system for identification of the called line for changed number purposes.

In FIG. 3, we show how a common intercept bus is connected to the connector sleeve leads of a 200-line connector group by way of intercept clips numbered 1–200. Since a maximum of 200 subscriber sleeve leads are common to a single intercept bus, it is necessary that the G relay in the connector being used be energized and that the K relay remain in the released condition prior to identification of the called number.

The K relay resistance ground start is required to sense demand for the intercept trunk. If any other connector in a common group of 200 lines attempts to gain access to the intercept bus, a busy guard signal is provided by the operation of the G relay.

As shown in FIG. 2, within the intercept trunk, a ground signal returned on the C lead from the intercept trunk to the regular interrupt trunk causes the CT relay to operate to cut through the T, R and S leads from the connector to the intercept trunk.

The operation of the intercept network may be described as follows: Trunk scanner in idle condition monitors TI (Trunk Idle) lead. Grounded TI lead indicates make busy or circuit busy condition to the trunk scanner. When trunk scanner is demanded by a regular or vacant or trouble intercept trunk by resistance ground on the S lead, trunk scanner finds the calling trunk and connects it to idle AIS trunk via a crosspoint on a crossbar switch. The trunk scanner cuts through T, R, S, C and CL leads. A check is made to see that the crosspoints are closed and speech path continuity is through. Battery is provided on C lead to operate CT relay in the regular intercept trunk. (Relay CT in the regular intercept trunk should operate. If CT fails to operate, the locked-in trunk scanner should be freed after a time-out period of 750 ms.—1 sec. The trunk scanner then is able to serve other demands if any.) Relay CT in a regular intercept trunk operating removes start to trunk scanner by removing ground on SP lead.

If a ground is not present due to customer abandoning the call, relay CT hold battery is removed, thus allowing relay CT release and also vertical busy ground is removed to release the crossbar switch.

An off-hook signal is then provided to the AIB (Automatic Intercept Bureau). At the AIB, when the incoming AIB trunk is attached to a receiver and a called number register, identification is requested. After the receipt of the wink, identifier is demanded by grounding DI lead to the ID guard circuit. Identifier guard circuit returns ground on demand out (DO) lead. Common highway leads between the identifier and the trunk are then connected. Also, cuts through ID tone lead to the sleeve of the trunk. Ground is applied to identifier start (IS) lead. After party test identifier attached (IA) signal (ground) is received on IA lead as an indication that the identifier is started and the called number identity is sent out to AIB. After identification is complete, IA ground is removed by the identifier. This allows a relay to operate and lock to master ground to remove demand ground on DI lead to the guard circuit, to disconnect DO relay; relay DO releases, and to provide 1K battery on S lead to allow the K relay in the connector to operate. Relay K in the connector operates and connects ring generator on leads T & R. The ring trip circuit of the connector is applied to trip this ringing in the silent as well as in the ringing period. After ring trip, the trunk is now in a transmission mode. In this manner, by the use of the resistance clip on the S lead, the K relay is prevented from operating until identification is complete. The intercepted line is also guarded against the connector being seized by another line during the trunk seizure and identification.

Described previously is a preferred embodiment of the invention. It is understood that modifications may be made therein, and it is intended to cover in the appended claims all such modifications which fall within the true spirit and scope of the invention.

We claim:

1. An intercept apparatus for a multiple exchange network comprised of at least one step-by-step exchange and centralized intercept equipment and apparatus coupled to the plural leads of a terminal of a final switch in said step exchange for providing intercept service for calls directed to said terminal, said apparatus including means for connecting certain of the leads from said terminal directly to equipment for forwarding said call from said exchange toward said intercept equipment, and other means interposed in another one of said leads from said terminal directed toward said equipment in which said final switch includes means for switching through a call and a guard means both connected to said one other lead, said interposed means preventing operation of said switch-through relay and permitting operation of said guard relay on the occurrence of a call to said terminal whereby to prevent ring current being sent to said terminal.

2. An apparatus as claimed in claim 1, wherein said interposed means comprises a resistance of approximately 1,300 ohms, and said switching through means includes a first relay and said guard means comprise a second relay.

3. An apparatus as claimed in claim 1, wherein said interposed means comprises a parallel combination of resistance and a rectifier.

4. An apparatus as claimed in claim 3, wherein the resistance is in the range of 1,000 to 2,000 ohms.

5. An intercept apparatus for a multiple exchange network comprised of at least one step-by-step exchange and centralized intercept equipment, the invention comprising an individual terminal block coupled to the plural leads of each terminal of final switches in said step exchange to be provided intercept service for calls directed to said terminals, said terminal blocks each including direct wire connections for the speech leads from said terminal directly to equipment for forwarding said call from said exchange toward said intercept equipment, and resistive means interposed in a control one of said leads from each said terminal directed toward said equipment, and in which each said final switch includes a switch-through relay and a guard relay both connected to said control lead, said resistive means preventing operation of said switch-through relay to prevent switching through of said final switch to enable operation of said guard relay on the occurrence of a call to said terminal.

* * * * *